United States Patent [19]
Helderman

[11] Patent Number: 5,366,328
[45] Date of Patent: Nov. 22, 1994

[54] ASSEMBLY FOR INSERTING AN ATTACHMENT COIL IN CONCRETE

[76] Inventor: J. F. Helderman, 414 S. Maple St., Graham, N.C. 27253

[21] Appl. No.: 72,923

[22] Filed: Jun. 7, 1993

[51] Int. Cl.$^5$ .................. F16B 13/04; F16B 39/02; B21D 39/00
[52] U.S. Cl. .................. 411/17; 411/11; 411/82; 411/178; 29/456
[58] Field of Search .................. 411/10, 11, 16, 17, 411/82, 178, 258; 29/456, 525, 525.1

[56] References Cited

U.S. PATENT DOCUMENTS

| | | |
|---|---|---|
| 556,082 | 3/1896 | Boeddinghaus . |
| 806,406 | 12/1905 | Farrington . |
| 906,691 | 12/1908 | Chenoweth . |
| 977,709 | 12/1910 | Craig . |
| 1,966,520 | 7/1934 | Rayner . |
| 2,233,889 | 3/1941 | Hood . |
| 2,588,860 | 3/1952 | Marks . |
| 2,690,693 | 10/1954 | Campbell . |
| 2,837,005 | 6/1958 | Gaul . |
| 3,018,684 | 1/1962 | Brancato . |
| 3,121,453 | 2/1964 | Modrey . |
| 3,983,736 | 10/1976 | King, Jr. . |
| 4,040,326 | 8/1977 | Breed . |
| 4,061,073 | 12/1977 | Easter et al. .................. 411/10 |
| 4,077,101 | 3/1978 | Wallace .................. 29/456 X |
| 4,309,135 | 1/1982 | Gutshall . |
| 4,536,115 | 8/1985 | Helderman . |
| 4,635,337 | 1/1987 | Helderman . |
| 4,954,018 | 9/1990 | Gauna .................. 411/10 |
| 5,006,023 | 4/1991 | Kaplan . |
| 5,255,423 | 10/1993 | Dworaczek et al. .................. 29/456 X |

FOREIGN PATENT DOCUMENTS

| | | |
|---|---|---|
| 536820 | 4/1955 | Belgium . |
| 1921753 | 11/1970 | Germany . |
| 2447232 | 4/1976 | Germany . |
| 21113 | 7/1929 | Netherlands . |

OTHER PUBLICATIONS

New Liebig Safety Bolts brochure, 10 Jun. 1977 10a.

Primary Examiner—Neill R. Wilson
Attorney, Agent, or Firm—Shefte, Pinckney & Sawyer

[57] ABSTRACT

An assembly for inserting an attachment coil in concrete with a screw having a releasable spacer and an expandable coil mounted thereon. The spacer initially positions the screw in a hole for location of the coil and has a slot to permit the spacer to pop off the screw as the screw is screwed into the coil in the hole. The spacer may have longitudinal ribs to bridge any lateral space between the screw and the hole. The coil has an exterior diameter less than the interior diameter of the hole for free movement of unexpanded loops without creating cross threading during insertion. A second coil can be inserted closer to the surface by assembling two spacers on a screw for location of the second coil, with both spacers popping off the screw as the screw advances into both coils. The use of two coils in a hole allows positioning of coils in both compression and tension zones on opposite sides of a neutral axis of the structure. A sealing compound may be inserted in the hole after removing a screw following insertion of a coil and then reinserting the screw to compress the sealing compound fully within the hole.

38 Claims, 8 Drawing Sheets

ASSEMBLY FOR INSERTING AN ATTACHMENT COIL IN CONCRETE

BACKGROUND OF THE INVENTION

The present invention relates to an assembly for inserting an attachment coil in concrete and a method for installing such a coil.

Seating of coils in holes of concrete or masonry members to provide threads for attaching screws or the like is well know. However, prior assemblies and methods for such use have suffered from the difficulty of controlling the location of the seating of the coil selectively to provide optimum strength. Examples of prior apparatus and methods are disclosed in U.S. Pat. Nos. 4,536,115 and 4,635,337 of the present inventor. These prior patents disclose the use of indicia grooves in attachment screws to provide a visually observable indication of when a coil carried on the screw has been inserted in the hole to a desirable depth, but this requires a special and relatively expensive screw with the groove formed therein rather than being able to use an inexpensive conventional screw and does not provide for seating two or more coils at different depths in a hole. Furthermore, when anchoring a fixture or machine to concrete or other masonry the installer is often in an awkward, uncomfortable position, and available lighting may make it difficult to sight a mark or indicia on the shank of the screw.

SUMMARY OF THE INVENTION

The present invention includes an assembly and method for positioning an anchoring device in the form of a coil, or multiple coils, in a pre-drilled hole in a concrete or masonry member for firmly engaging a lag screw or other member. The coils consist of a series of turns and may be made of metal, which in use is circumferentially expand into the wall of the hole. Rather than requiring a special attaching screw with a positioning groove formed therein, the present invention utilizes a positive stop spacer sleeve that can be positioned on a conventional attachment screw to initially stop the axial insertion of an attachment coil at a predetermined initial insertion depth without the installer having to sight the positioning of the screw. These sleeves are constructed of relatively stiff but resiliently yieldable material, so that when the sleeve is placed upon an insertion screw shank below the head of the screw, it will remain in place, as well as support a pre-assembled washer between the underside of the fastener's head and the sleeve and then will pop off the shank when the screw is advanced into the coil to seat the coil in the hole.

The live loads sustained by concrete or masonry members are likely to be variable, unknown in actuality, subject to excessive increases, and applied suddenly. Therefore, a larger safety factor is needed to allow for such uncertainties than when considering the dead load of concrete members to be static and determinable. Thus, increased resistance to pull-out in terms of increased size of the anchor screw above the normal requirement is of no real benefit when the screw is located only in a zone that becomes a tension zone when subjected to loading. More reliable results are probable when anchors are placed so that their expansion elements are located in both the tension and compression zones of a slab, and will remain in both tension and compression zones, even during times of stress reversal or in regions of contraflexure.

If a concrete beam is loaded sufficient to bend so as to cause compression in the top and tension in the bottom, the deformations of the materials at any point will vary in proportion to their distance from a point of no strain called the neutral axis. A concrete floor or roof slab is essentially a rectangular beam of comparatively large ratio of width to depth. In theory a slab which is supported on two sides only consists of a series of rectangular beams, side by side. When a slab is supported on four sides, its structural analysis is more complicated than that of slabs with two-side support only, but regardless of the shape or support there is always a neutral axis located somewhere between the compression zone and tension zone in a stressed beam or slab. A beam or slab curves if subjected to a bending moment because the parts that are in compression shorten and those which are subject to tension elongate. As the concrete section bends more with increased loading, the stresses in the section will vary from zero at the neutral axis to a maximum at the extreme outer fiber. As the loads and the bending increase, the concrete in the tension zone will eventually reach a stress level that causes it to crack.

Also, there are circumstances and conditions under which normal stresses for dead or static loading may be reversed, or increased, or both, thus producing areas of contraflexure where a tension zone, perhaps temporarily, becomes a compression zone and the compression zone becomes a tension zone.

A concrete anchor placed in the tension zone of a floor slab, or bridge deck, which is suddenly subjected to increased loading which only slightly enlarges or elongates the diameter of the anchor hole may eventually cause the anchor to fail after repeated such loadings. Also a seismic event may cause a complete reversal of compression/tension zones. If it is realized that the top of a floor slab located directly above a column is ordinarily in a tension zone while the underside of a floor slab located above a column is ordinarily a compression zone, a ground wave caused by an earth tremor will magnify the motion of the top of a column over that amount of motion to be expected at the bottom of the same column, which may raise or lower the height or orientation of the column.

In one form of the present invention, coil expansion elements are located on both sides of the neutral axis of a beam, or concrete slab, so as to provide firm resistance to loosening, or withdrawal in both the tension and compression zones of structural members, thereby reducing the possibilities of an anchor loosening under vibratory conditions such as may be produced during seismic activity, or when the structures are subjected to large moving live loads, as in the case of bridges.

Thus, the present invention provides a simple way to increase the probable safety of concrete anchors placed in flat slabs or a drop panel construction by initially installing one expansion element above the neutral axis of slabs and then installing another expansion element on the other side of the neutral axis, or by installing one longer than ordinary expansion element across the neutral axis into both the compression and tension zones. To do this, the present invention contemplates using two yieldable stop elements to position the screw for insertion of a second expansion element at a shallower depth after having inserted a first element at a greater depth, or to position the screw for insertion of a long element.

Nowhere in the known prior art is there any suggestion of a concrete or masonry anchor which, after it is once set in place, can then be reinforced by introducing another anchor member at a different depth in the same hole to increase resistance to pull-out, resistance to impact loading or vibration, or decrease in the safety factor requirement.

Cross threading between the screw threads and loops of wire coils are a common failure with coil/screw thread anchors, when ordinary open loop wire coils, which match the diameter and pitch of the screw threads, are used together. Expansion elements of this invention have been developed to avoid cross threading by providing a coil with a first geometry and dimension which allow the screw threads to progress rotationally and axially through the coil loops without developing unparallel helix angles that would result in cross threading. As the screw thread progresses rotationally and axially through the wire coil, the coil is re-formed into a second geometry and dimension which then conforms to the requirements of an anchor expansion element.

To further prevent cross threading between the wire coil expansion element and the lag screw threads, the wire coil is formed from soft, non-spring wire in which one end of the coil has one loop partially expanded and spaced a sufficient distance from an adjacent coil to accept the first, not fully formed, threads on the gimlet point of a lag screw and be retained thereon, with this first wire loop matching the helix angle of the screw thread. The remaining loops of the wire coil are then wound to a smaller outside diameter than the nominal diameter of the screw threads. The inside diameter of these coil loops are preferably from 50% to 60% of the thread root diameter. The spacing between successive coil loops may range from 15% of the wire diameter to 33% of that diameter.

These dimensions allow that the helix angles of the screw threads and of the wire coil remain in parallel alignment while the wire coil is being re-formed by the screw threads to conform to a second geometrical dimension that will serve the purpose of an embedded element and permanent screw thread.

The originally reduced inside diameter allows the leading screw edge on the gimlet point of the lag member to slice between the coil loops. As the threads progress helically and axially through the wire coil, the unengaged loops of the coil are caused to wiggle from side to side in a clockwise direction, thus forcing the wire coil loops to expand and conform exactly to the screw thread root diameter and helix angle.

Open coils that originally conform to the screw's major diameter and thread pitch cannot be relied upon to remain in perfect helical alignment with the screw threads. Any deformity to the wire coil while inserting it into the hole, or by mishandling during manufacture, shipping or at point of use, is likely to cause an unparallel helical alignment between the coil and the screw which in turn will produce cross threading. Trial and error has proven that reliable results are obtained when the screw element is allowed to reshape an undersized coil to conform to the dimensions and geometry of the mating screw.

Briefly described, the present invention includes a releasable spacer for use on the shank of a screw that is used to insert and expand an expandable helical attachment coil in a cylindrical hole in a concrete structure by axially inserting the screw into the hole a predetermined distance from the unexpanded coil at the tip of the screw to seat the coil in the hole at a predetermined axial location and then rotating the screw to helically advance it into the coil to expand the coil radially into the wall of the hole to provide for attachment of a threaded element in the hole. The releasable spacer is a yieldable member having a throughbore for mounting of the member on the shank of the screw with the screw extending through the bore. The member has one end at one end of the bore for engagement under the head of the screw and an opposite end at the other end of the bore for engagement against the concrete structure adjacent the hole. The spacer member is of a length sufficient to locate the opposite end a distance from the coil on the tip of the screw equivalent to the predetermined distance the coil is to be located axially in the hole for radial expansion, with contact of the spacer member against the head of the screw and the concrete structure providing an indication that the coil has been inserted a desired predetermined distance in the hole. The spacer member is releasable from the screw in response to the axial compressive force imposed by screwing the screw into the coil.

Preferably, the spacer member imposes a sufficient resistance to axial compression to provide a recognizable indication that the spacer member is in contact with the head of the screw and the concrete structure without the installer having to visually observe the depth of initial insertion. The spacer member is deformable under compression sufficient to become dislodged from the screw in response to advance of the screw by screwing into the inserted coil. This dislodgement can be accomplished by the spacer member being resilient.

To permit spreading of the spacer member sufficient to assemble onto the screw and to become dislodged therefrom by compression, the spacer member is formed with an axially extending slot throughout its length, with the slot being flared adjacent an end of the spacer member to facilitate assembly of the member on the screw. In the preferred embodiment the spacer is formed with exterior, radially projecting and axially extending ribs that not only strengthen the spacer member but also serve to bridge any gap that there may be at the opening of the hole in the concrete member, thereby preventing the spacer member from being wedged in the hole.

In one form of the invention, two spacer members are used end-to-end on the screw when it is desired to insert a second coil in the hole at a spacing that is at a lesser depth in the hole than the first-inserted coil.

In the preferred embodiment, the invention is in the form of an assembly that includes the spacer member and a screw, on the shank of which the spacer member is assembled, and an expandable coil assembled on the tip of the screw. The spacer member of this embodiment may include, individually or in combination, the various features of the previously described spacer member.

The present invention also includes a method of inserting and expanding an expandable helical attachment coil in a cylindrical hole in a concrete structure by assembling the coil on the tip end of a screw and assembling a yieldable spacer member on the shank of the screw, with the spacer member being of the type and having in various forms the features of the spacer member described above. The screw and assembled coil are inserted axially into the hole until the end of the spacer member assembled on the screw contacts the concrete structure. The screw is then screwed into the hole to expand the coil into the wall of the hole and to dislodge the yieldable spacer member from the screw. Preferably, the exterior diameter of a substantial extent of the unexpanded coil is less than the inner diameter of the hole to permit lateral movement of the unexpanded coil as the screw is screwed into the coil in the hole.

In an alternate form of the method, the method described above is followed to insert a first coil and then the screw is retracted and two spacer members are placed end-to-end on the screw and a second coil is assembled on the tip of the screw and inserted with the two spacer members locating the second coil at a lesser depth spacing from the first-inserted coil. Preferably, the first-inserted coil is not expanded by the screw before the screw is withdrawn so that it is not expanded until the second coil has been inserted and expanded and the screw threaded further into the hole to engage and expand the first-inserted coil. This facilitates the threaded alignment of the two coils to facilitate aligned threaded securement of an attachment screw.

Preferably, the coil in unexpanded condition has a substantial extent that has an exterior diameter less than the inner diameter of the hole to permit lateral movement of the unexpanded coil as the screw is expanding the coils. This is of particular benefit when two coils are inserted as described above and the first-inserted coil is expanded after the screw has expanded the second coil and is advancing into the first-inserted coil and is bringing the two coils into substantial alignment.

In the preferred embodiment of the above-described two coil insertion method, the assembly is used to insert two coils in a concrete structure in which the hole extends through a neutral axis of the structure on opposite sides of which the structure is susceptible of being subjected to opposite tension and compression forces and the first coil is inserted to a location on one side of the neutral axis and the second coil is inserted to a location on the opposite side of the neutral axis. Alternatively, the method can be practiced with a single coil, with the spacer member locating the coil so that it extends through and to opposite sides of the neutral axis. In another form of the two coil insertion method, one of the coils may be made of non-resilient material and the other one made of resilient material to ensure maintained attachment of a screw during fluctuations in the tension/compression conditions.

To provide a sealing feature, the method of the present invention can be practiced by retracting the attachment screw from the coil and withdrawing it from the hole, and then inserting a sealing material into the hole and reinserting the screw into the coil, thereby displacing the sealing material and forcing it into the interstices of the hole.

The above-described feature of using an expandable helical attachment coil with a substantial extent of the unexpanded coil having an outer diameter less than the inner diameter of the hole to permit lateral movement of the unexpanded coil as the screw is progressively screwed into the coil can be practiced advantageously with or without the above-described spacer member for location of the coils. Similarly, the two coil insertion method described above can be practiced with or without the use of a space member or spacer members for controlling the location. Similarly, the locating of coils with respect to the neutral axis as described above can be practiced with or without the other features of the present invention, as can the use of the sealing material in the method as described above.

DETAILED DESCRIPTION OF THE PREFERRED EMBODIMENTS

Figure 5:
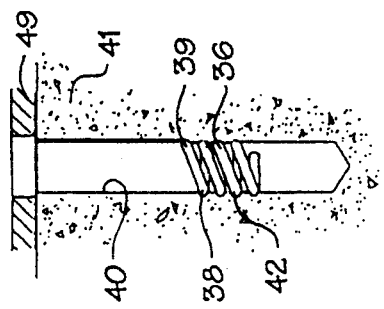
FIG. 5 is a view showing the screw removed from the hole and the coil remaining expanded in the wall of the hole.

Referring first to the preferred embodiment of FIGS. 1–10, the assembly 30 includes a screw 31 having a hexagonal head 32 at one end and a gimlet point or tip 33 at its opposite end from which a uniformly threaded portion 34 extends to an unthreaded shank portion 35 that extends from the head 32. An expandable coil 36 is assembled on the tip 33 and extends outwardly therefrom. A cylindrical spacer 37 is assembled on the unthreaded shank portion 35 of the screw 31.

Figure 9:
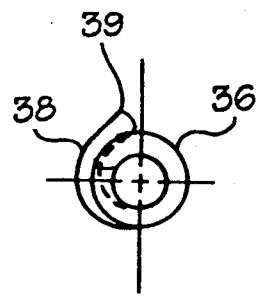
FIG. 9 is an end view of the coil of FIG. 8 as viewed from the left in FIG. 8.
Figure 8:
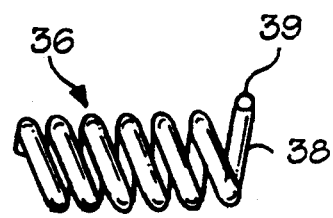
FIG. 8 is a side view of the coil of the assembly of FIG. 1.
Figure 10:
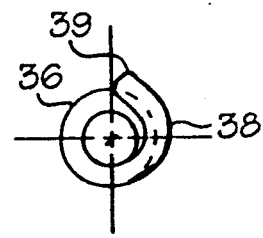
FIG. 10 is an end view of the coil of FIG. 8 as viewed from the right end of FIG. 8.

The coil 36 of the preferred embodiment is illustrated in FIGS. 8, 9 and 10. It has an enlarged loop 38 at one end slightly larger than the nominal thread diameter of the screw 31, with a tip 39 projecting laterally outwardly to score or scrape the sidewall of a predrilled hole 40 of a concrete or masonry structure 41. This projecting tip 39 prevents the coil 36 from rotating when the screw 31 is torqued to advance into and expand the main loops 42 of the coil 36. This projecting tip 35 may be of any configuration which will bear against, or into, the wall of the hole 40 sufficient to prevent rotation of the coil 36. By the time the screw 31 has been rotated an eighth to a quarter turn into the coil 36 the coil will be permanently fixed and prevented from rotating. A projection could also be utilized at the other end of the coil 36 or at some location intermediate the length of the coil to perform this same function.

The pitch of the enlarged first loop 38 of the coil 36 should preferably be equal to the pitch of the thread of the screw 31. The main loops 42 of the coil 36 are formed with a pitch diameter smaller than the nominal pitch diameter of the threads of the screw 31. The inside diameter of these main loops 42 may be from 50% to 60% of the thread root diameter of the screw 31. The spacing between successive main loops 42 may be between 15% of their wire diameter to 33% of the wire diameter. But the pitch of the main loops 42 should not exceed the pitch of the mating screw threads.

These proportionate dimensions will allow the screw thread pitch and the coil loop pitch to remain in parallel helical alignment while the coil 36 is being expanded from the unexpanded configuration (FIGS. 1 and 2) to an expanded configuration (FIGS. 3–5) in the sidewall of the hole 40.

The enlarged loop 38 will allow the coil to be preassembled to the gimlet point 33 of the screw threads and turned to tighten enough to be retained thereon.

The main loops 42 of reduced diameter will permit the leading edge of the progressing screw thread to slice between the loops (FIGS. 3 and 4) to begin expanding the coil 36 into its expanded configuration (FIG. 5). While main loops 42 are being progressively expanded the unexpanded loops are free to wiggle about in a clockwise direction, first touching one side of the hole 40, then the other as the leading thread of the screw slices between and opens the space between loops to conform to the screw thread pitch, thus reducing the possibility of cross threading occurring during installation.

It has been found that wire coil loops originally spaced apart to conform to the spacing of the screw thread pitch and diameter are unreliable in preventing cross threading. Any deformity to that kind of wire coil while it is being inserted into a hole, during shipping or during handling, can cause an unparallel helix angle alignment, or a coil with greater pitch distance than the screw threads, either of which may produce cross threading. Only a coil which is expanded from undersize to the screw dimension by a rotating screw will reliably avoid cross threading.

The number of loops in a wire coil has a definite effect on the resulting holding power, or resistance to pull-out, of a concrete anchor of the wire coil/screw thread type. The more wire coil loops engaging corresponding screw threads the stronger the resistance to pull-out. Thus, a coil can be produced that will develop the full strength of the anchor screw or develop the full strength of the concrete. By simply using enough loops and engaging an equal number of screw threads in a hole of correct depth, load testing will either break the screw or break the concrete rather than the coil. It is therefore one object of this invention to provide means whereby a previously set, or installed, anchor may be reinforced to develop greater holding power after it has been initially installed, if it is desired to increase the safety factor.

Figure 6:
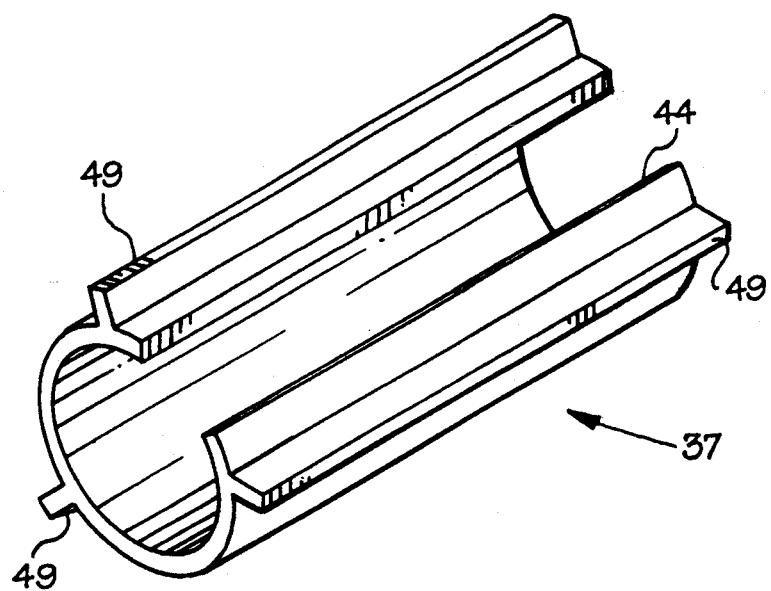
FIG. 6 is a perspective view of the spacer of the assembly of FIG. 1.
Figure 7:
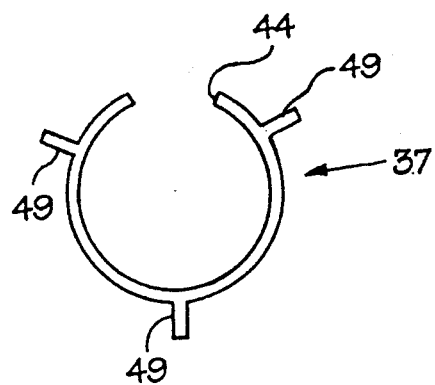
FIG. 7 is an end view of the spacer of FIG. 6.

The spacer 37 of the embodiment of FIGS. 1–10 is illustrated in FIGS. 6 and 7. This spacer 37 is generally tubular and dimensioned to fit, as previously mentioned, on the unthreaded shank portion 35 of the screw 31. For this purpose, it is formed with a longitudinally extending slot 43 throughout its length, which permits the spacer 37 to pop off the screw 31 when it is compressed between the head 32 of the screw 31 and the concrete structure 41 or a mounting plate 44, such as a foot plate of machinery to be secured to the structure 41. This slot 43 also can serve to permit assembly of the spacer 37 onto the unthreaded shank portion 35 of the screw 31 by opening the spacer 37 at the slot 43, which may be a desired manner of assembly in a procedure where the coil 36 is first assembled on the screw 31 before the spacer 37 is attached.

FIGS. 15–20 illustrate an assembly 45 utilizing the same type of screw 31 and coil 36 as in the embodiment of FIGS. 1–10, but the spacer 46 in this embodiment has one end 47 of its slot 48 flared for ease of assembly on the screw 31.

The spacers 37, 46 are of material rigid enough to be retained about the shank portion 35 of the screws 31 and resilient enough to pop off the screw 31 when subjected to compressive forces as the screw is torqued. Obviously, the spacers 37, 46 provide an indication of the depth of insertion of the screw 31 and coil 36 into the hole 40 of the concrete structure 41 without requiring sighting of a marking or other determination of the depth of insertion. Other configurations of spacers may be utilized to provide the purposes described.

As the diameter of the screw 31 is controlled at the time of manufacture and the diameter of the hole 40 is controlled by the drill bit diameter which is controlled by diameter tolerance standards which are adhered to by the masonry drill bit manufacturers, the only unknown diameter dimension to be considered is the preformed hole diameter through the fixture or machinery mounting plate 44 which is to be anchored to the concrete structure 4. Therefore, to prevent the spacer from being forced into the mounting plate hole so that it will not pop off the screw shank 35 when it is compressed by the underside of the screw head 32 during torquing, the wall thickness of the spacer or fins, flanges, or spool shapes, or other projections may be utilized to span any gap between the screw 31 and the hole of the mounting plate 44. In FIGS. 6 and 7 the spacer 37 is formed with exterior radially projecting, longitudinally extending ribs 49 that also provide a strengthening function. These ribs or other projections or the thickness of the spacer also can be utilized to support a washer 50 pre-assembled between the spacer 31 and the head 32 of the screw 31 to prevent a deep driving socket 56 (FIGS. 16–20) from seating over the end of the spacer and thereby preventing the spacer element from popping off the screw 31.

Figure 1:
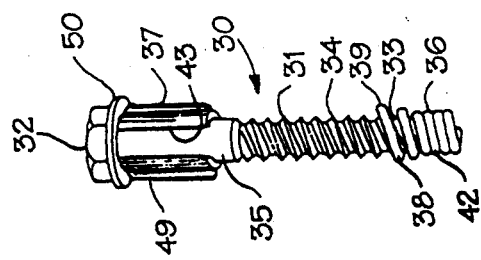
FIG. 1 is a perspective view of an assembly of an attachment screw, expandable coil and releasable spacer according to the preferred embodiment of the present invention.

FIGS. 1–5 illustrate in series the procedure involved in inserting and expanding a coil 36 in a hole 40 in a concrete structure 41. This procedure may be followed whether the coil is to be used to serve for attachment of an overhead anchor, or of an anchor in a floor, in a wall or in an edge application. FIG. 1 illustrates an assembly 30 of a headed screw 31, a washer 50 held against the underside of the head 32, a spacer 37 and a wire expansion coil 36 retained on the gimlet point 33 of the screw 31.

Figure 2:
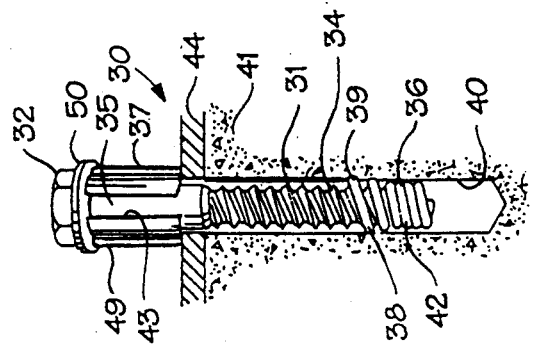
FIG. 2 is a perspective view of the assembly of FIG. 1 shown inserted in a hole in a concrete structure to the extent allowed by the spacer.

FIG. 2 illustrates the assembly 30 partially inserted in a pre-drilled hole 40 and through a flange of a mounting plate 44 which is to be secured to the structure 41. At this location the assembly 30 has been tapped in axially until the spacer abuts the mounting plate 44 and the screw head 32, at which position the spacer 37 yieldably resists further insertion of the screw, indicating to the operator that the screw is in proper position for the coil 36 to be expanded into the wall of the hole 40.

Figure 3:
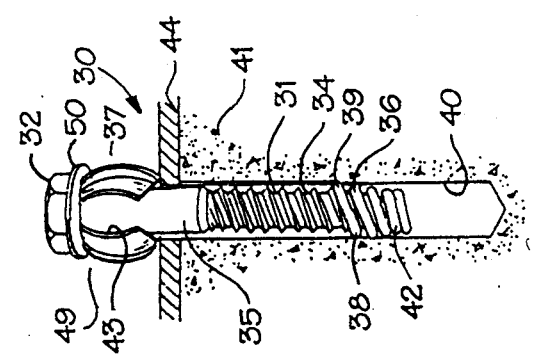
FIG. 3 is a view similar to FIG. 2 showing the screw being screwed into the coil to expand the coil in the hole and compressing the spacer.

FIG. 3 illustrates the screwing or torquing of the screw 31 into the coil 36 to partially expand the coil 36 with the spacer beginning to deform under an imposed compressive force caused as the screw is torqued and advances axially into the coil 36 and hole 40.

Figure 4:
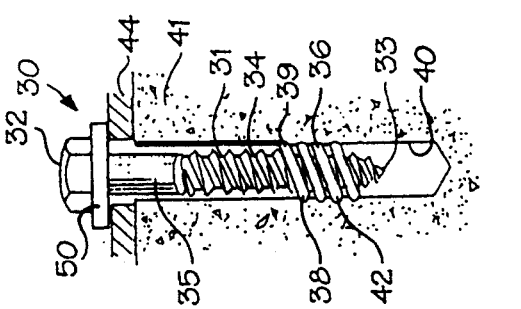
FIG. 4 is a view similar to FIG. 3 showing the screw fully inserted in the hole and the coil fully expanded.

FIG. 4 illustrates a fully and completely set screw or anchor. The spacer 37 has by now popped off and the gimlet point 33 with its reduced diameter lead screws now project through the expanded wire coil 36.

FIG. 5 illustrates the coil 36 expanded into the wall of the hole 40 after the set anchor screw and washer have been removed, with the coil 36 acting as a permanently inserted screw thread in readiness for the installation of an anchor or for insertion of a second coil at a lesser depth.

FIGS. 11–14 illustrate how a spacer 37 may be used with a hanger-bolt anchor for the suspension of objects such as pipe. A full description of the installation and removal of hanger bolt anchors may be found in U.S. Pat. Nos. 4,536,115 and 4,635,337.

Figure 11:
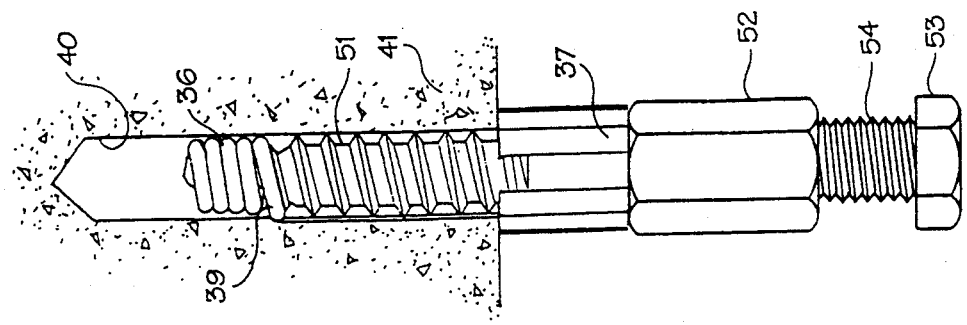

In FIG. 11, a spacer 37 has been positioned on the shank 35 of a screw 51 against one end of a coupling nut 52 threaded on machine screw threads on the outer end of the screw 51. A hex headed bolt 53 has machine screw threads 54 engaged with the internal machine screw threads in the opposite end of the coupling nut 52 until the machine screw threads of both the screw 51 and bolt 54 meet and bear against each other inside the coupling 52, thus providing a means for torquing the entire assembly to effect the setting and expansion of the wire coil 31.

Figure 12:
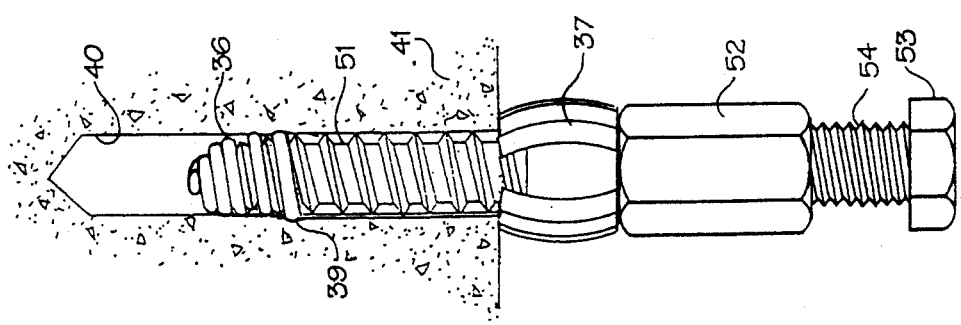

In FIG. 12, the spacer 37 is being deformed while the bolt and screw assembly is being torqued in order to set and expand the wire coil 36. Further torquing will cause the spacer 37 to pop off its position on the shank 35 of the screw 51. It then has completed its purpose.

Figure 13:
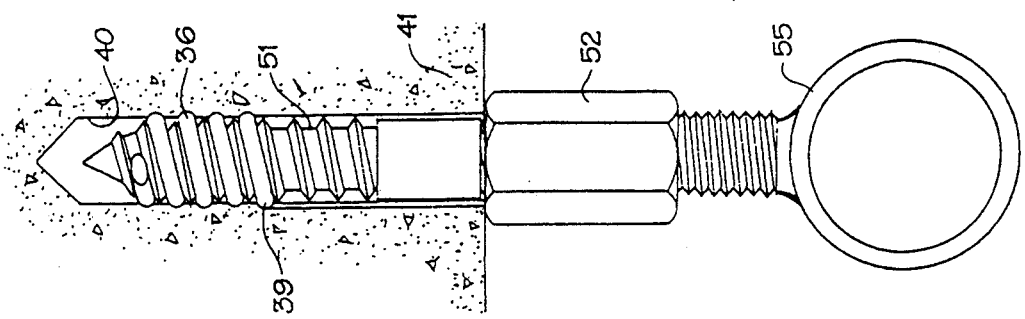

In FIG. 13, the screw 51 has been completely set, the wire coil 36 fully expanded and the bolt 54 has been replaced with a pipe yoke 55 to support a pipe.

Figure 14:
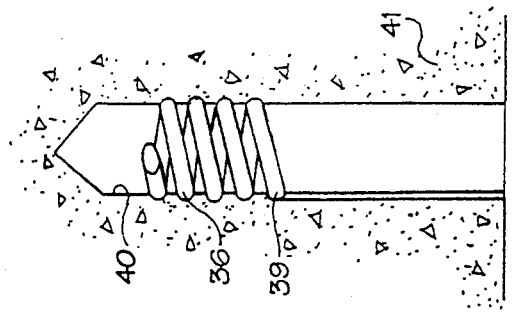
FIGS. 11, 12, 13 and 14 are views similar to FIGS. 1, 2, 3 and 4, illustrating the insertion and expansion of a coil into a hole that extends upwardly from a bottom surface of a concrete structure and showing the screw with a threaded portion on which a positioning nut is threaded and to which a hanger bolt is threaded, with the nut initially positioning the spacer on the screw, FIG. 13 illustrating the hanger bolt in the form of a ring for supporting a line or other strand material.

In FIG. 14, the entire hanger bolt assembly including a pipe yoke 55 has been removed, leaving the expanded coil 36 in place as a permanent threaded insert ready for the installation of an anchor or another wire coil, or for application of a sealing compound, if desired, or for permanently plugging of the hole if, for example, the hanger bolt assembly is no longer needed, or the pipe line has been re-routed.

Figure 15:
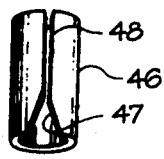
FIG. 15 is a perspective view of another form of spacer having a slot that is flared at one end to facilitate assembly on a screw.
Figure 16:
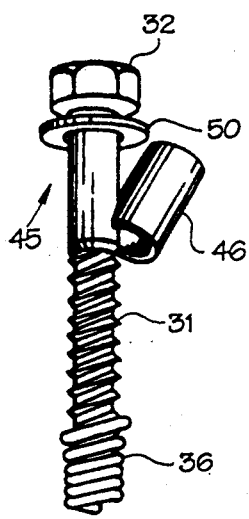
FIG. 16 is a perspective view of a screw with a coil and a washer assembled thereon and illustrating the spacer of FIG. 15 as it is being assembled onto the screw.
Figure 17:
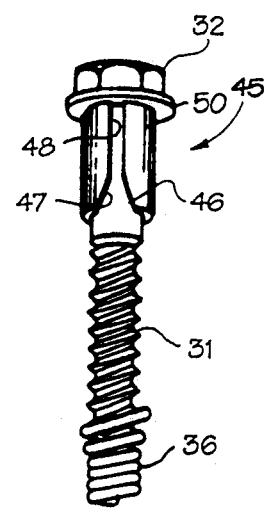
FIG. 17 is a perspective view of the assembly of FIG. 16 with the spacer fully assembled on the screw.
Figure 18:
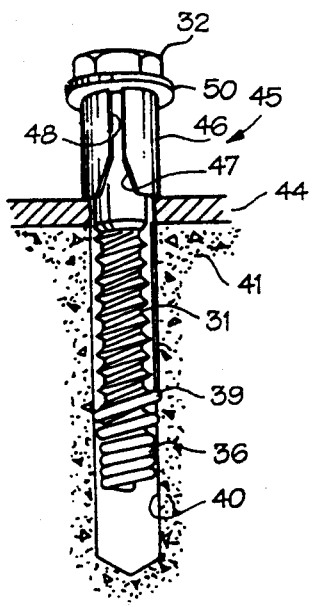
FIG. 18 is a perspective view of the assembly of FIG. 16 shown inserted in the hole of a concrete structure to the extent allowed by the spacer.
Figure 19:
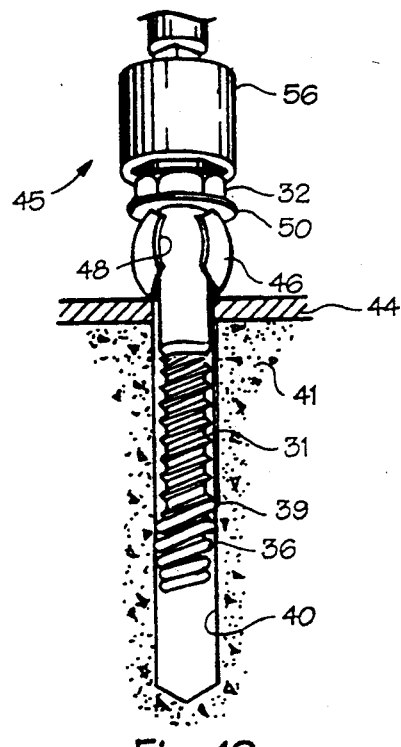
FIG. 19 is a view similar to FIG. 18 showing the screw partially screwed into the coil and compressing the spacer.
Figure 20:
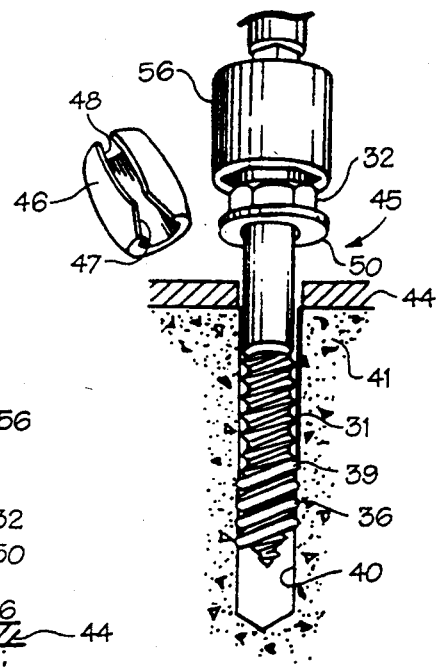
FIG. 20 is a view similar to FIG. 19 showing the screw further screwed into the coil and with the spacer being dislodged from the screw.
Figure 21:
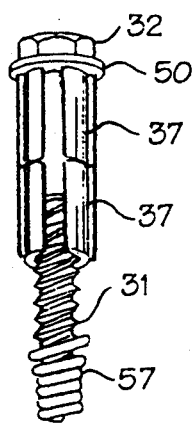
FIG. 21 is a perspective view of the assembly of FIG. 1 with two spacers mounted end-to-end on the screw.

FIGS. 16–20 illustrate the sequence of assembling the spacer 46 of the type illustrated in FIG. 15. In this embodiment the spacer 46 has a flared end slot 48 that facilitates mounting on a screw 31 that already has a coil 36 assembled thereon. These figures then show the procedure for inserting the assembly 45 into the structure hole 40 axially until the spacer 46 stops the insertion of the screw 31 in proper location for positioning the coil 36 at a desired depth within the structure hole 40 (FIG. 18). The screw 31 is then rotated by engagement of the socket 56 of a drive tool on the hex head 32 of the screw 31 and against the washer 50.

One of the features of the present invention is the use of the coil inserting and expanding assembly and method to insert and expand two or more spaced coils within a hole of a concrete structure to add attaching strength for mounting of an anchor and to provide tension/compression neutralizing attachment. This is illustrated in FIGS. 21–25, wherein a first coil 57 has been inserted in a hole 58 in a concrete or masonry structure 59 in the manner described above.

After the insertion of this first coil 57, two spacers 37 of the type described above with regard to FIGS. 1–10 are assembled on the screw 31 with a second coil 60 assembled on the gimlet point of the screw 31 and a washer 50 is disposed between the spacers 37 and the head 32 of the screw 31.

Figure 22:
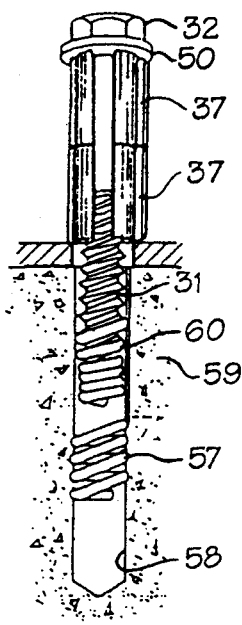
FIG. 22 is a perspective view of the assembly of FIG. 21 shown inserted into a hole in a concrete structure to the extent allowed by the two spacers and showing a coil already inserted and expanded in the hole prior to insertion of the assembly illustrated.

As illustrated in FIG. 22, the two spacers 37 now limit the axial insertion of the screw 31, with the second coil 60 thereon, into the hole 58, with the second coil 60 being spaced from the first coil 57.

Figure 23:
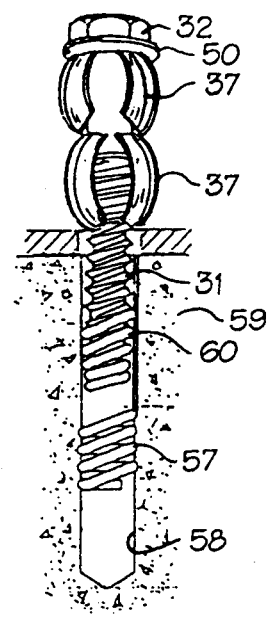
FIG. 23 is a view similar to FIG. 22 showing the screw being screwed into the coil and compressing the spacers.

As illustrated in FIG. 23, the screw 31 is then torqued to screw it into the second coil 60, thereby compressing the spacers 37.

Figure 24:
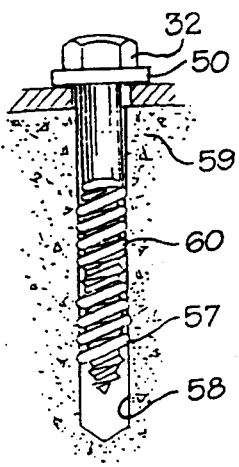
FIG. 24 is a view similar to FIG. 23 showing the screw fully inserted into the coil carried by the screw and further into the coil that was already in the hole.

FIG. 24 illustrates the screw 31 torqued fully into the hole 40 until the washer 50 seats on the mounting plate 44. By this time, the spacers 37 have popped off the screw 31. During this screwing or torquing of the screw 31 the screw expands the second coil 60 into a permanent threaded disposition in the hole 40 and continues to advance into the first coil 57 to facilitate alignment of the threads of the first and second coils sufficiently for threading of an anchor bolt therein.

Figure 25:
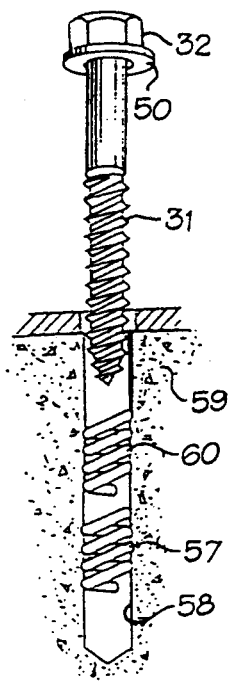
FIG. 25 is a view similar to FIG. 24 showing the screw being removed from the hole and leaving the two coils inserted and expanded in the hole.

FIG. 25 illustrates the screw 31 being removed from the hole 40, leaving the first and second coils 57,60 expanded and embedded in the wall of the hole 40 for receipt of an anchor bolt.

An alternate method of setting multiple coils is to place the first coil into the pre-drilled hole using the screw with one spacer, then withdraw the screw without expanding the wire coil. Then place a second coil on the end of the gimlet point of the screw and place two spacers on the shank of the anchor screw, inserting this assembly into the pre-drilled hole until the first spacers stop further penetration. The screw may then be torqued to expand the wire coil nearest the surface, and continuing to turn the screw until the screw engages the inner wire coil and expands it also.

There are several reasons why the added reinforcement of a second coil may be desirable. One reason may be that a slab of concrete has not developed the strength that it was designed for. The strength of the anchorage may accordingly be increased to safely handle the expected load by inserting two coils. Another reason may be that a machine may develop more vibration than was expected such that to reduce the possibility of the anchor loosening under vibration another, or other, coils may be afterwards installed. In this case, while the normal coil is constructed of soft annealed wire, a second coil may be formed of spring wire to lock the anchor against rotating under vibration.

It has been found that for ordinary fastenings spring coils are undesirable because, while the lag screw used with a spring coil causes the spring to expand and be partially embedded into the side of the anchor hole wall without undue difficulty, the removal of a screw from a spring coil is very difficult because the spring wire loops tend to constrict and squeeze the thread root diameter of the screw when an attempt to unthread the screw from the spring wire coil is made. This squeezing of the thread root of the screw threads thereby successfully locks the anchor in place, but the removal of such an anchor is very difficult and damages the screw threads, or the spring coil cuts its own thread impression into the wall of the anchor hole while being backed out, and afterwards the anchor and anchor hole are unusable.

However, it has also been found that if a resilient coil made from plastic such as nylon is used as single or multiple coils the screw may be removed from the anchorage without damage to the screw threads or hole. The screw may again be reused in the same expanded element without sacrifice to the original integrity of the fastening. The resilient nylon coils produce less resistance to anchor pull-out than metal coils, but the resistance of the fastening to loosening under vibrating light loads is increased.

Another important reason for using multiple coils to reinforce an anchorage is that an anchoring coil may be placed in both the tension and compression zones of a concrete slab and be thereby better enabled to resist the stresses imposed by shifting, unexpected, large moving live loads, during periods of stress reversal, or in regions of contraflexure, guaranteeing that in any event at least one anchoring element will remain in a compression zones as tension zones are always potential danger zones for ordinary mechanically expanded concrete anchors.

To install multiple anchor coils on both sides of the neutral axis of floor and roof slabs does not require excessively deep anchor holes with the present invention. Generally the thickness of such slabs conforms to a formula which states that the perimeter of the slab, in inches, is to be divided by 180 to determine minimum thickness of reinforced slabs. In other words, a slab which measures 20 feet by 20 feet between supports would have a perimeter of 12 inches by 80 feet, or 960 inches. When divided by 180 a slab of 5.33 inches thick is indicated, which, in a practical manner, indicates a slab which probably would not exceed 6 inches thick.

Since the neutral axis of such slabs is usually found near the center of the slab, a hole depth of $3\frac{1}{2}$ inches to 4 inches is indicated for such a slab, for the installation of anchors with expansion elements in both the compressive and tension zones.

Figure 26:
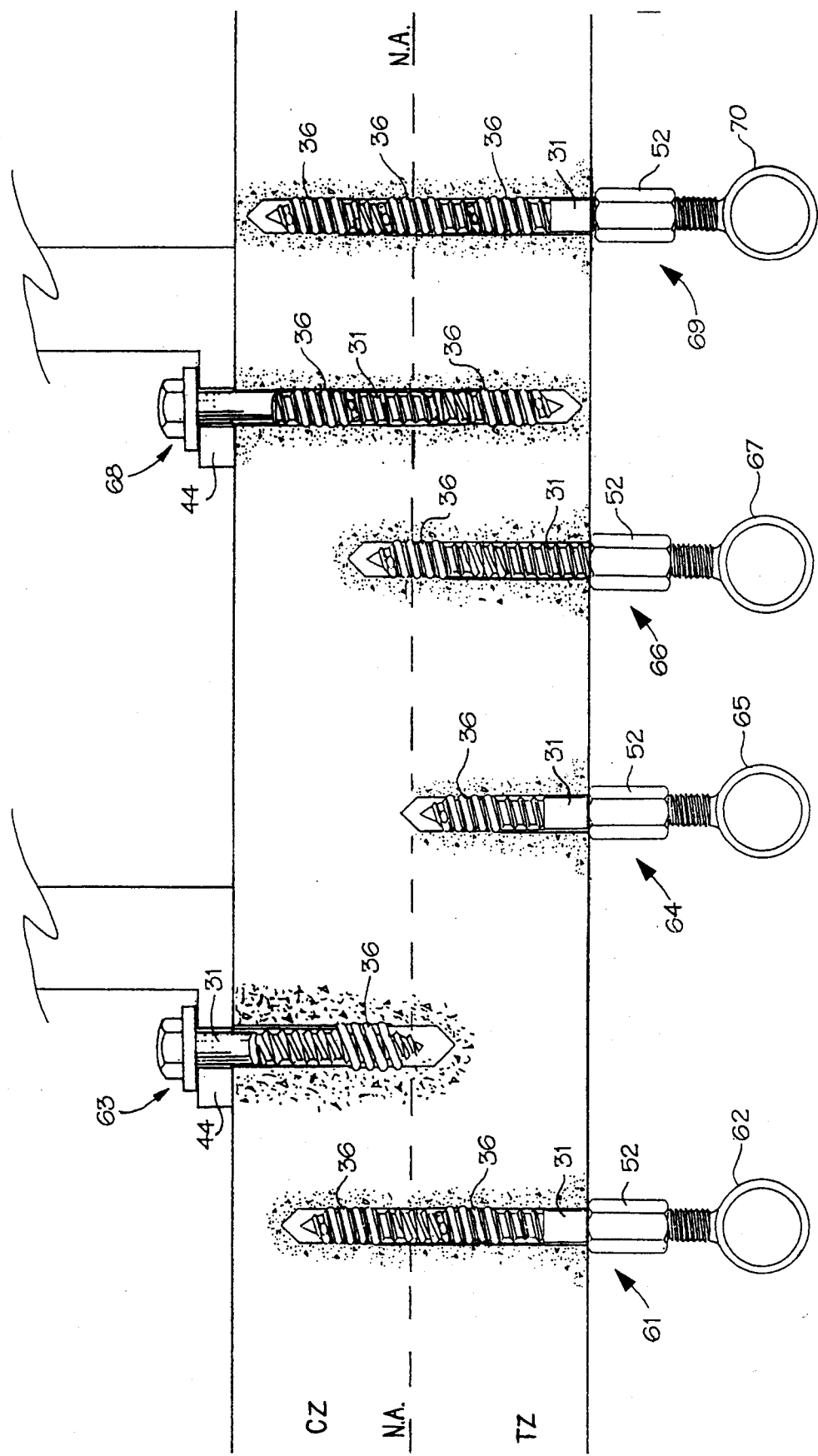
FIG. 26 illustrates a vertical cross-section of a concrete slab with various types of assemblies of the present invention inserted in varying depths and from opposite sides of the slab.

The series of installations illustrated in FIG. 26 demonstrate anchor installations using single and multiple coils in relationship to the neutral axis NA of a typical floor slab. (For clarity, no reinforcing steel is shown, reinforcing steel being a separate engineering consideration of no significance to this invention.)

The first installation from the left in FIG. 26 is a hanger bolt anchor assembly 61 with a pipe supporting yoke 62 attached to the machine screw threaded end of the bolt 61. Two wire coils 36 are expanded in place, one above the neutral axis (NA) in what is usually a compression zone (CZ) and a second below the neutral axis (NA), in what is usually a tension zone (TZ).

The second installation 63 from the left in FIG. 26 is of the type previously described with reference to FIGS. 1-10 with the coil 36 set in the compression zone (CZ) above the neutral axis (NA).

Similarly, the third installation is in the form of a hanger bolt anchor 64 with a pipe supporting yoke 65 installed in the manner shown in FIGS. 11-14 with the coil 36 located in the tension zone (TZ) below the neutral axis (NA).

The fourth installation is in the form of a hanger bolt anchor 66 with a pipe supporting yoke 67 and a single coil 36 extending across the neutral axis (NA) and being disposed in both the compression zone (CZ) and tension zone (TZ). A longer than normal wire coil may be used in this installation for effective extension into both zones.

The fifth installation is in the form of an elongated anchor 68 installed similar to that illustrated in the second installation, but extending sufficiently to position two coils 36, one in the compression zone (CZ) and one in the tension zone (TZ) with the neutral axis (NA) therebetween.

The sixth installation is in the form of an anchor 69 having an attached pipe supporting yoke 70 with three coils 36. The first coil is set in place well above the neutral axis (NA) in the compression zone (CZ). The second coil is set astride the neutral axis (NA) for additional reinforcement in both the compression zone (CZ) and the tension zone (TZ). The third coil is set below the neutral axis (NA) in the tension zone (TZ).

The use of coils on both sides of a neutral axis (NA) ensures that regardless of shifting and unexpected live loads one coil will always be in a compression zone. Even if a shifting or unexpected live load never occurs, the utilization of multiple coils increases an anchor's resistance to pull-out, with a proportionate increase in resistance to loosening under vibration.

Figure 29:
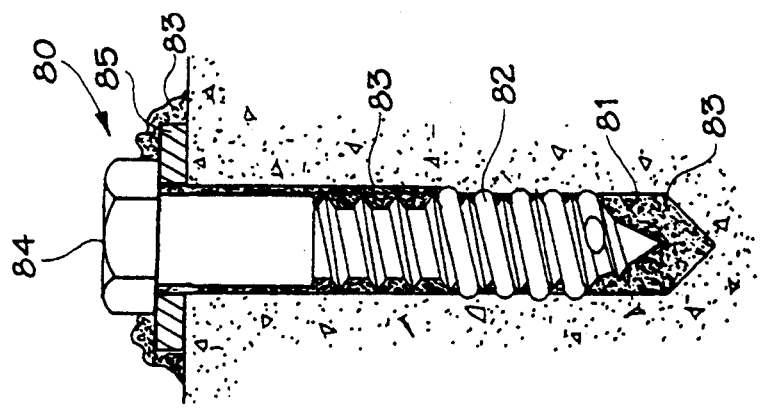
FIGS. 27, 28 and 29 illustrate in sequence the insertion and expansion of a coil using the assembly of the present invention, inserting a sealing compound into the hole with the coil inserted and expanded, and inserting a screw into the hole with the sealing compound being forced to fill the remaining space in the hole and to extrude from the top of the hole.
Figure 28:
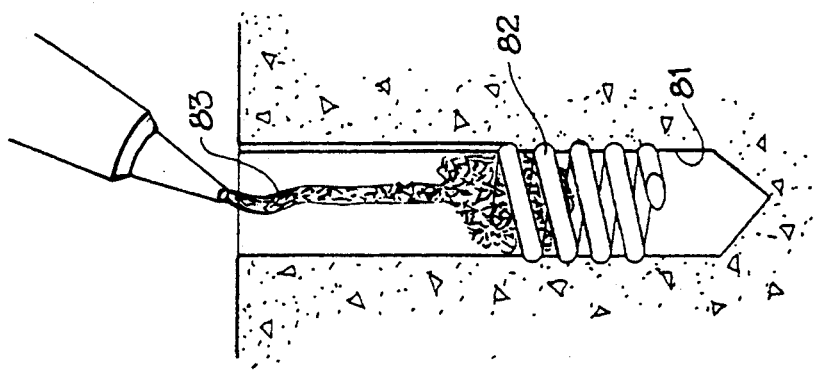
Figure 27:
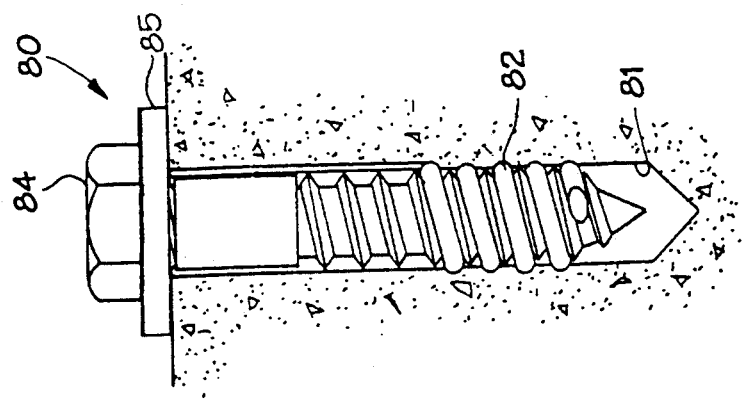

FIGS. 27, 28 and 29 illustrate a method of sealing a lag screw, wire coil and hole against penetration of liquids that freeze and thaw with consequent damage, or rusting, to the anchor, or base material into which the anchor is installed, or against penetration be deleterious gases or fumes, or the colonization of bacteria or vermin where fixtures are to be installed in areas where sanitary conditions must be maintained, such as in food processing or pharmaceutical production.

In FIG. 27, a through-set anchor is shown in partial cross-section. A hex headed lag screw 80 is set in a hole 81 with an expanded wire coil 82 in a manner as described above with reference to FIGS. 1–10. In FIG. 28, the lag screw 80 has been removed leaving the expanded wire coil 82 in place, then a caulking compound 83 of any type suitable for the application at hand is injected into the hole 81. Then, as illustrated in FIG. 29, the lag screw 80 is reinserted and torqued to tighten, thus causing the caulking compound 83 to be injected into every crack, crevice, pore or fissure existing within the walls of the hole 81, and extruding out the mouth of the hole 81 flowing under the head 84 of the screw 80 and around the washer 85, or fixture, and effectively sealing the anchorage against entry by foreign matter.

The reason that other types of through-set anchors cannot be successfully caulked in place is that threads, sleeves, wedges, etc., fit too closely together in the hole and there is no way to apply the pressure necessary to force the caulking compound through these tight-fitting components and be injected into every opening, pore, or crack, or extruded out the mouth of the hole because in setting other types of through-cut anchors they are pulled outward, creating cavities, not filling cavities as is necessary to properly seal a hole. In contrast, the pressure created by an inward advancing screw as with the present invention causes the pressure necessary to fill all cavities with caulk and then overflow the hole.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A releasable spacer for use on the shank of a screw that is used to insert and expand an expandable helical attachment coil in a cylindrical hole in a concrete structure by axially inserting the screw into the hole a predetermined distance with the unexpanded coil at the tip of the screw to seat the coil in the hole at a predetermined axial location and then rotating the screw to helically advance it into the coil to expand the coil radially into the wall of the hole to provide for attachment of a threaded element in the hole, said releasable spacer comprising a yieldable member of a non-metallic resilient material having a through bore for mounting of the member on the shank of the screw with the screw extending through the bore, said member having one end at one end of the bore for engagement under the head of the screw and having an opposite end at the other end of the bore for engagement against the concrete structure adjacent the hole, said member having a length sufficient to locate said opposite end a distance from the coil on the tip of the screw equivalent to the predetermined distance the coil is to be located axially in the hole for radial expansion, contact of the member against the head of the screw and the concrete structure providing an indication that the coil has been inserted a desired predetermined distance in the hole, said member being releasable from the screw in response to the axial compressive force imposed by screwing the screw into the inserted coil.

2. A releasable spacer according to claim 1 and characterized further in that said member imposes a sufficient resistance to axial compression to provide a recognizable indication that said member is in contact with the head of the screw and the concrete structure.

3. A releasable spacer according to claim 1 and characterized further in that said member is deformable under compression sufficient to become dislodged from said screw in response to advance of the screw by screwing into the inserted coil.

4. A releasable spacer according to claim 3 and characterized further in that said member is resilient for resilient dislodgement from the screw upon application of compressive force by screwing of the screw into the coil.

5. An assembly for use in inserting and expanding an expandable helical attachment coil in a cylindrical hole in a concrete structure comprising a screw, an expandable coil assembled on the tip of the screw, and a releasable spacer assembled on the shank of the screw, said releasable spacer being a yieldable member having a through bore for mounting of the member on the shank of said screw with said screw extending through the bore, said member having one end at one end of the bore for engagement under the head of the screw and having an opposite end at the other end of the bore for engagement against the concrete structure adjacent the hole upon axial insertion of the coil and screw into the hole, said member having a length sufficient to locate said opposite end a distance from the coil on the tip of the screw equivalent to the predetermined distance the coil is to be located axially in the hole for radial expansion, contact of the member against the head of the screw and the concrete structure providing an indication that the coil has been inserted a desired predetermined distance in the hole, said member being releasable from the screw in response to the axial compressive force imposed by screwing the screw into the inserted coil.

6. An assembly for use in inserting and expanding an expandable helical attachment coil in a cylindrical hole of a concrete structure according to claim 5 and characterized further in that said member imposes a sufficient resistance to axial compression to provide a recognizable indication that said member is in contact with the head of the screw and the concrete structure.

7. An assembly for use in inserting and expanding an expandable helical attachment coil in a cylindrical hole of a concrete structure according to claim 5 and characterized further by two said members disposable end-to-end on a screw for insertion of a coil using both members.

8. An assembly for use in inserting and expanding an expandable helical attachment coil in a cylindrical hole of a concrete structure according to claim 5 and characterized further in that said member is deformable under compression sufficient to become dislodged from said screw in response to advance of the screw by screwing into the inserted coil.

9. An assembly for use in inserting and expanding an expandable helical attachment coil in a cylindrical hole of a concrete structure according to claim 8 and characterized further in that said member is formed with exterior, axially extending strengthening ribs.

10. An assembly for use in inserting and expanding an expandable helical attachment coil in a cylindrical hole of a concrete structure according to claim 8 and characterized further in that said member is resilient for resilient dislodgement from the screw upon application of compressive force by screwing of the screw into the coil.

11. An assembly for use in inserting and expanding an expandable helical attachment coil in a cylindrical hole of a concrete structure according to claim 10 and characterized further in that said member is formed with an axially extending slot extending throughout its length to permit spreading of said member sufficient to assemble onto the screw and to become dislodged therefrom by compression.

12. An assembly for use in inserting and expanding an expandable helical attachment coil in a cylindrical hole of a concrete structure according to claim 11 and characterized further in that the slot is flared adjacent an end of the member to facilitate assembly of the member on the screw.

13. A method of inserting and expanding an expandable helical attachment coil in a cylindrical hole in a concrete structure comprising assembling the coil on the tip end of a screw and a yieldable spacer member on the shank of the screw, wherein the spacer member has a through bore for mounting of the member on the shank of the screw with the screw extending therethrough, said member having one end at one end of the bore for engagement under the head of the screw and having an opposite end at the other end of the bore for engagement against the concrete structure adjacent the hole, said member having a length sufficient to locate said opposite end a distance from the coil on the tip of the screw equivalent to the predetermined distance the coil is to be located axially in the hole for radial expansion, contact of the member against the head of the screw and the concrete structure providing an indication that the coil has been inserted a desired predetermined distance in the hole, said member being releasable from the screw in response to the axial compressive force imposed by screwing the screw into the inserted coil, inserting the screw and assembled coil axially into the hole until said opposite end of said member assembled on the screw contacts the concrete structure, and then screwing said screw into the hole to expand the coil into the wall of the hole and to dislodge the yieldable spacer member from the screw.

14. A method of inserting and expanding an expandable helical attachment coil in a cylindrical hole in a concrete structure according to claim 13 and characterized further by retracting the screw from the coil and withdrawing it from the hole, inserting a sealing material into the hole and reinserting the screw and screwing it into the coil, thereby displacing the sealing material and forcing it into the interstices of the hole.

15. A method of inserting and expanding an expandable helical attachment coil in a cylindrical hole in a concrete structure according to claim 13 and characterized further in that the hole extends through a neutral axis of the structure on opposite sides of which the structure is susceptible of being subjected to opposite tension and compression forces and in that the coil is inserted to a location at which the coil extends through and to opposite sides of the neutral axis.

16. A method of inserting and expanding an expandable helical attachment coil in a cylindrical hole in a concrete structure according to claim 13 and characterized further in that the exterior diameter of a substantial extent of the unexpanded coil is less than the inner diameter of the hole to permit lateral movement of the unexpanded coil as the screw is screwed into the coil in he hole.

17. A method of inserting and expanding an expandable helical attachment coil in a cylindrical hole in a concrete structure according to claim 13 and characterized further by retracting the screw from the expanded coil and withdrawing it from the hole, assembling a second coil on the tip of the screw and assembling two spacer members end-to-end on the screw, inserting the screw and assembled second coil axially into the hole until an end of one spacer member contacts the concrete structure and an end of the other spacer member contacts the head of the screw, then screwing the screw into the second coil to expand the second coil into the wall of the hole at a spacing from the first coil.

18. A method of inserting and expanding an expandable helical attachment coil in a cylindrical hole in a concrete structure according to claim 17 and characterized further in that the hole extends through a neutral axis of the structure on opposite sides of which the structure is susceptible of being subjected to opposite tension and compression forces and in that the first coil is inserted to a location on one side of the neutral axis and the second coil is inserted to a location on the opposite side of the neutral axis.

19. A method of inserting and expanding an expandable helical attachment coil in a cylindrical hole in a concrete structure according to claim 17 and characterized further in that in inserting one of the coils a non-resilient coil is inserted and in inserting the other of the coils a resilient coil is inserted.

20. A method of inserting and expanding an expandable helical attachment coil in a cylindrical hole in a concrete structure according to claim 17 and characterized further in that before the screw is screwed into the first coil it is withdrawn from the hole, and then after expanding the second coil the screw is screwed into the first coil to expand the first coil into the wall of the hole.

21. A method of inserting and expanding an expandable helical attachment coil in a cylindrical hole in a concrete structure according to claim 20 and characterized further in that the exterior diameter of a substantial extent of the unexpanded first coil is less than the inner diameter of the hole to permit lateral movement of the unexpanded first coil as the screw is screwed into the coil.

22. A method of inserting and expanding an expandable helical attachment coil in a cylindrical hole in a concrete structure according to claim 20 and characterized further in that the hole extends through a neutral axis of the structure on opposite sides of which the structure is susceptible of being subjected to opposite tension and compression forces and in that the first coil is inserted to a location on one side of the neutral axis and the second coil is inserted to a location on the opposite side of the neutral axis.

23. A method of inserting and expanding an expandable helical attachment coil in a cylindrical hole in a concrete structure according to claim 20 and characterized further in that in inserting one of the coils a non-resilient coil is inserted and in inserting the other of the coils a resilient coil is inserted.

24. A method of inserting and expanding an expandable helical attachment coil in a cylindrical hole in a concrete structure comprising assembling on the tip of a screw an expandable helical attachment coil with a substantial extent of the unexpanded coil having an outer diameter less than the inner diameter of the hole, inserting the screw and assembled coil axially into the hole to a predetermined location of the coil in the hole, and then screwing said screw into the hole to expand the coil into the wall of the hole with the lesser inner diameter of the coil permitting lateral movement of the unexpanded coil within the hole as the screw is progressively screwed into the coil.

25. A method of inserting and expanding an expandable helical attachment coil in a cylindrical hole in a concrete structure comprising assembling on the tip of a screw an expandable helical attachment coil, inserting the screw and assembled coil axially into the hole to a predetermined location of the coil in the hole, then screwing said screw into the hole to expand the coil into the wall of the hole, retracting the screw from the expanded coil and withdrawing it from the hole, assembling a second coil on the tip of the screw, inserting the screw and assembled second coil axially into the hole to a second predetermined coil location spaced axially outward from the first predetermined location, then screwing the screw into the second coil to expand the second coil into the wall of the hole.

26. A method of inserting and expanding an expandable helical attachment coil in a cylindrical hole in a concrete structure according to claim 25 and characterized further in that in inserting one of the coils a non-resilient coil is inserted and in inserting the other of the coils a resilient coil is inserted.

27. A method of inserting and expanding an expandable helical attachment coil in a cylindrical hole in a concrete structure according to claim 25 and characterized further in that the hole extends through a neutral axis of the structure on opposite sides of which the structure is susceptible of being subjected to opposite tension and compression forces and in that the first coil is inserted to a location on one side of the neutral axis and the second coil is inserted to a location on the opposite side of the neutral axis.

28. A method of inserting and expanding an expandable helical attachment coil in a cylindrical hole in a concrete structure according to claim 25 and characterized further in that before the screw is screwed into the first coil it is withdrawn from the hole, and then after expanding the second coil the screw is screwed into the first coil to expand the first coil into the wall of the hole.

29. A method of inserting and expanding an expandable helical attachment coil in a cylindrical hole in a concrete structure according to claim 25 and characterized further in that the exterior diameter of the unexpanded first coil is less than the inner diameter of the hole to permit lateral movement of the unexpanded first coil as the screw is progressively screwed into the coil.

30. A method of inserting and expanding an expandable helical attachment coil in a cylindrical hole in a concrete structure according to claim 28 and characterized further in that the hole extends through a neutral axis of the structure on opposite sides of which the structure is susceptible of being subjected to opposite tension and compression forces and in that the first coil is inserted to a location on one side of the neutral axis and the second coil is inserted to a location on the opposite side of the neutral axis.

31. A method of inserting and expanding an expandable helical attachment coil in a cylindrical hole in a concrete structure according to claim 28 and characterized further in that in inserting one of the coils a non-resilient coil is inserted and in inserting the other of the coils a resilient coil is inserted.

32. A method of inserting and expanding an expandable helical attachment coil in a cylindrical hole and a concrete structure in which the hole extends through a neutral axis of the structure on opposite sides of which the structure is susceptible of being subjected to opposite tension and compression forces, said method comprising assembling an expandable coil on the tip of a screw, inserting the screw and unexpanded coil axially into the hole to a location at which the coil extends across and to opposite sides of the neutral axis, and then screwing the screw into the coil to expand the coil into contact with the wall of the hole.

33. A method of inserting and expanding an expandable helical attachment coil in a cylindrical hole and a concrete structure, said method comprising assembling an expandable coil on the tip of a screw, inserting the screw and unexpanded coil axially into the hole, screwing the screw into the coil to expand the coil into the wall of the hole, retracting the screw from the coil and withdrawing it from the hole, inserting a sealing material into the hole and reinserting the screw and screwing it into the coil, thereby displacing the sealing material and forcing it into the interstices of the hole.

34. A releasable spacer for use on the shank of a screw that is used to insert and expand an expandable helical attachment coil in a cylindrical hole in a concrete structure by axially inserting the screw into the hole a predetermined distance with the unexpanded coil at the tip of the screw to seat the coil in the hole at a predetermined axial location and then rotating the screw to helically advance it into the coil to expand the coil radially into the wall of the hole to provide for attachment of a threaded element in the hole, said releasable spacer comprising a yieldable member having a through bore for mounting of the member on the shank of the screw with the screw extending through the bore, said member having one end at one end of the bore for engagement under the head of the screw and having an opposite end at the other end of the bore for engagement against the concrete structure adjacent the hole, said member having a length sufficient to locate said opposite end a distance from the coil on the tip of the screw equivalent to the predetermined distance the coil is to be located axially in the hole for radial expansion, contact of the member against the head of the screw and the concrete structure providing an indication that the coil has been inserted a desired predetermined distance in the hole, said member being resilient for resilient dislodgement from the screw in response to the axial compressive force imposed by screwing the screw into the inserted coil, said member being formed with an axially extending slot extending through out its length to permit spreading of said member sufficient to assemble onto the screw and to become dislodged therefrom by compression.

35. A releasable spacer according to claim 34 and characterized further in that the slot is flared adjacent an end of the member to facilitate assembly of the member on the screw.

36. A releasable spacer for use on the shank of a screw that is used to insert and expand an expandable helical attachment coil in a cylindrical hole in a concrete structure by axially inserting the screw into the hole a predetermined distance with the unexpanded coil at the tip of the screw to seat the coil in the hole at a predetermined axial location and then rotating the screw to helically advance it into the coil to expand the coil radially into the wall of the hole to provide for attachment of a threaded element in the hole, said releasable spacer comprising a yieldable member having a through bore for mounting of the member on the shank of the screw with the screw extending through the bore, said member having one end at one end of the bore for engagement under the head of the screw and having an opposite end at the other end of the bore for engagement against the concrete structure adjacent the hole, said member having a length sufficient to locate said opposite end a distance from the coil on the tip of the screw equivalent to the predetermined distance the coil is to be located axially in the hole for radial expansion, contact of the member against the head of the screw and the concrete structure providing an indication that the coil has been inserted a desired predetermined distance in the hole, said member being deformable in response to the axial compressive force imposed by screwing the screw into the inserted coil sufficient to become dislodged from said screw in response to advance of the screw by screwing into the inserted coil, said member being formed with exterior, radially projecting and axially extending ribs.

37. A releasable spacer for use on the shank of a screw that is used to insert and expand an expandable helical attachment coil in a cylindrical hole in a concrete structure by axially inserting the screw into the hole a predetermined distance with the unexpanded coil at the tip of the screw to seat the coil in the hole at a predetermined axially location and then rotating the screw to helically advance it into the coil to expand the coil radially into the wall of the hole to provide for attachment of a threaded element in the hole, said releasable spacer comprising two yieldable members each having a through bore for mounting of the member on the shank of the screw with the screw extending through the bore, said members being disposable end-to-end on the screw for insertion of a coil using both members, one said member having one end at one end of its said bore for engagement under the head of the screw and the other said member having an opposite end at the other end of its said bore for engagement against the concrete structure adjacent the hole, said members having a length sufficient to locate said opposite end a distance from the coil on the tip of the screw equivalent to the predetermined distance the coil is to be located axially in the hole for radial expansion, contact of the one member against the head of the screw and the other member against the concrete structure providing an indication that the coil has been inserted a desired predetermined distance in the hole, said members being releasable from the screw in response to the axial compressive force imposed by screwing the screw into the inserted coil.

38. A method of inserting and expanding an expandable helical attachment coil in a concrete structure in a cylindrical hole according to claim 24 and characterized further in that, in inserting the screw and assembled coil, the coil is unexpanded axially, and, in screwing said screw into the hole, the coil is expanded axially.

* * * * *